United States Patent
Weinstein

[11] Patent Number: 5,839,251
[45] Date of Patent: Nov. 24, 1998

[54] MASONRY STRUCTURE BUILDING AID

[76] Inventor: Alex Howard Weinstein, 4403 W. Grace St., Richmond, Va. 23230

[21] Appl. No.: 732,610

[22] Filed: Oct. 16, 1996

[51] Int. Cl.$^6$ .................................................... E04F 21/18
[52] U.S. Cl. ........................ 52/749.13; 52/127.1; 52/389; 52/664; 52/667; 52/747.11; 52/747.12; 52/749.11; 52/750
[58] Field of Search ................................ 52/127.3, 396.1, 52/415, 389, 390, 392, 750, 749.13, 747.1, 747.11, 747.12, 745.21, DIG. 2, 127.1, 391, 664, 677, 749.11; 249/61, 96; 264/247, 317, 278, DIG. 44; 106/819, 823

[56] References Cited

U.S. PATENT DOCUMENTS

| | | | |
|---|---|---|---|
| 2,777,789 | 1/1957 | Smith | 52/177 X |
| 3,210,445 | 10/1965 | McClarney | 52/747.12 X |
| 4,123,582 | 10/1978 | Musyt | 428/335 |
| 4,126,003 | 11/1978 | Tomic | 106/807 X |
| 4,126,005 | 11/1978 | Coursen | 106/807 X |
| 4,126,009 | 11/1978 | Tomic | 106/807 X |
| 4,127,001 | 11/1978 | Tomic | 106/807 X |
| 4,338,048 | 7/1982 | Murphy et al. | 106/724 X |
| 4,772,326 | 9/1988 | Heinen et al. | 106/696 X |
| 5,181,966 | 1/1993 | Honeycutt et al. | 134/42 |
| 5,224,601 | 7/1993 | Gouge et al. | 206/524.7 |
| 5,320,851 | 6/1994 | De Mars et al. | 424/451 |

*Primary Examiner*—Robert Canfield
*Attorney, Agent, or Firm*—Norman B. Rainer

[57] ABSTRACT

A masonry construction aid that enables novice and professional masons to easily construct a masonry structure such as a sidewalk, patio, driveway or vertical wall. The aid allows its user to insert masonry into a pre-determined, pre-formed, soluble pattern that contains within it a bonding material. After applying a catalyst such as water to the pattern, the pattern will disintegrate, the bonding agent will activate and bond the masonry together and harden into a permanent structure. This will result in a masonry structure that does not require any special skills to construct. The user will not be required to prepare or apply mortar, or manually align the masonry.

6 Claims, 2 Drawing Sheets

MASONRY STRUCTURE BUILDING AID

BACKGROUND OF THE INVENTION

1. Field of the Invention

This invention relates to the field of masonry. More specifically, this invention relates to the art of enabling novice and professional masons to more easily lay and set masonry of various shapes, sizes and materials.

2. Background Art

Many people find it difficult to lay brick and various shaped paving stones permanently onto a fixed structure properly. The process consists of preparing a smooth and level surface, applying a layer of mortar for the foundation for the bricks or paving stones (rock, slate, etc.) to set in, laying the bricks or paving stones in proper alignment, then applying mortar between the bricks or stones. Each one of these tedious steps has to be accomplished properly to facilitate a level and square, permanently fixed surface. Artisans trained in this brick and stone laying process have less difficulty than the untrained novice. This often prevents the novice from accomplishing this process on his or her own. Furthermore, the high labor costs to employ a brick or masonry artisan often prohibits the unskilled person to have installed a brick or masonry surface.

Several different types of articles have been devised to aid both the skilled artisan and the novice in laying brick and masonry surfaces.

One method on horizontal surfaces is to use sand as the foundation for the masonry, align the masonry according to a pattern on top of the foundation, and fill the spaces between the masonry with sand. This method alleviates the need to mix and apply mortar but does not offer a permanent structure. With this method the masonry can shift and plant material can grow up through the sand.

Another method is to apply dry mortar as a foundation, align the masonry according to a pattern on top of the dry mortar foundation, fill in the spaces between the masonry with dry mortar, then saturate the mortar with water. Eventually the mortar cures and hardens, leaving a permanent foundation and the masonry bonded together permanently. With this method, the mason must still meter the proper amount of dry mortar for the foundation and ensure that it is level. The mason must also manually align the masonry properly on the surface of the foundation and must also fill the spaces in between the masonry with dry mortar.

There is also available an article that is a mold for making the actual masonry, but still requires a mason to prepare a level mortar foundation, align the masonry and fill in the spaces between the masonry with mortar.

Another aid that is available, is a plastic tray that is used as a pattern to lay the masonry into. This allows simple alignment of the masonry. However, the user still must mix mortar and meter the proper amount of mortar for the foundation, and fill in the spaces between the masonry.

SUMMARY OF THE INVENTION

It is an object of the present invention to provide an article which helps the professional mason to more efficiently install masonry permanently onto a horizontal surface.

It is also an object of the present invention to provide an article which helps the professional mason to more efficiently install masonry permanently onto a vertical surface.

It is also an object of the present invention to provide an articles which enables the unskilled mason to install masonry permanently onto a horizontal surface.

It is also an object of the present invention to provide an article which enables the unskilled mason to install masonry permanently onto a vertical surface.

It is also an object of the present invention to provide an article which will eliminate the need for the professional or novice mason to prepare and apply a foundation of mortar in order to permanently set the masonry into the surface of the structure.

It is also an object of the present invention to provide an article which will eliminate the need for the professional or novice mason to concern themselves with the skill or act of aligning the masonry in the proper pattern.

It is also an object of the present invention to provide an article which will eliminate the need for the professional or novice mason to apply mortar in the spaces between the masonry in order to permanently set the masonry into the surface of the structure.

To accomplish the above objects, the present invention is an article of manufacture that comprises of a container structure, and a filler material dispose within the container structure. The container structure is soluble by a catalyst so that the application of the catalyst exposes the filler material to ambient conditions. Once the filler material is exposed to ambient conditions, a catalyst is applied to the filler material so that the filler material exhibits bonding properties to bond the masonry together and to cure and harden the filler material into a permanent structure. The container structure and filler material is shaped in order to accept the masonry units in a predetermined pattern, for the purpose of simplified alignment of the masonry units.

DETAILED DESCRIPTION OF THE PREFERRED EMBODIMENTS

Figure 1:
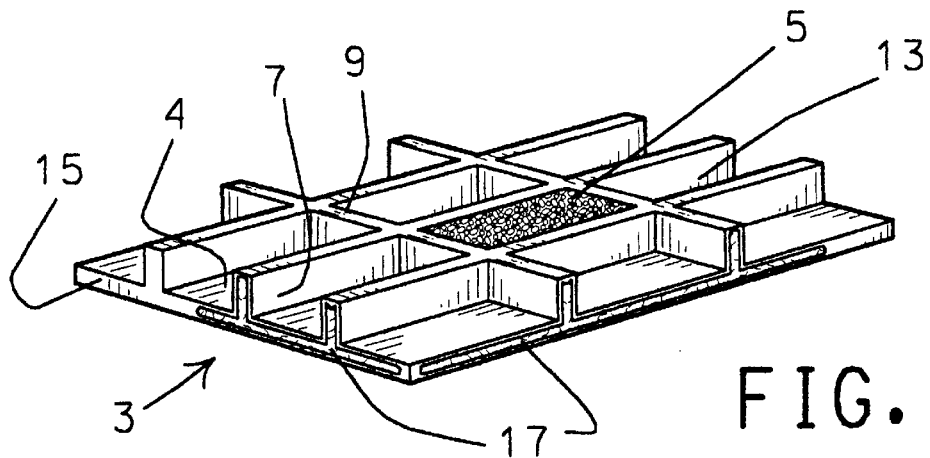
FIG. 1 shows a perspective view and cutaway of the invention according to the first embodiment.

The invention provides a mat that consists of two parts. One part of the mat is a container structure and the other part of the mat is the filler material. The container structure serves the dual purpose of both holding the filler material and forming the pattern for the masonry to fit into. The filler material in the preferred embodiment will contain a mortar or cement or some other material with the potential to exhibit bonding properties. This filler material will not possess bonding properties until a catalyst such as water or another chemical comes into contact with the filler material. The container structure is made of a material that exhibits the proper porosity to contain the filler material, but will also disintegrate with the contact and saturation of a catalyst. In the preferred embodiment the container structure is constructed out of a material that is water soluble, such as polyvinyl alcohol, cellulosics, natural gums, gelatin, polyethylene oxide or any other water soluble material. When a catalyst such as water or another chemical comes into contact with the container structure, the container structure dissolves and leaves the filler material exposed to be acted upon by a catalyst.

In a first approach, the chemical catalyst that is used for the filler material is identical to the catalyst used for the container material. In this approach, when the catalyst saturates the container material, it breaks down the container material, saturates the filler material, and causes the filler material to exhibit bonding properties and eventually bonds the masonry both to each other and to the surface that the masonry are laying on, and permanently harden the filler material.

In a second approach, the chemical catalyst that is used for the container material and the chemical catalyst that is used for the filler material are different. The purpose of the first catalyst is to breakdown and disintegrate the container material. The purpose of the second catalyst is to saturate the filler material, cause the filler material to exhibit bonding properties and cause the filler material to eventually bond the masonry both to each other and to the surface that the masonry are laying on, and permanently harden the filler material.

The first embodiment of the article according to the present invention would be utilized to build a horizontal structure. This first embodiment could use the methods of catalyst from either the first or second approaches. For this first horizontal surface embodiment, the user would first prepare a level horizontal surface. The user would then lay the article onto the horizontal surface. The user of the article would simply insert the masonry into the recesses on the top surface of the apparatus, which are formed by the vertical container structure walls and the top horizontal surface of the container structure. The vertical container structure walls, the top horizontal surface and the bottom horizontal surface form a hollow portion which is filled with the filler material bonding agent. The next step would be to apply the single chemical catalyst according to the first approach, or the first of two chemical catalysts according to the second approach. The container structure walls would break down and begin to disintegrate. According to the first approach, the catalyst would be applied until the filler material was saturated to ensure thorough bonding properties and hardening of the filler material. According to the second approach, after the container structure material was in the appropriate stage of disintegration, the second catalyst would be applied until the filler material was saturated to ensure thorough bonding properties and hardening of the filler material. These actions would cause the masonry to be both bonded to the surface underneath the apparatus and to each other. This article would allow a person, unskilled in masonry to easily construct a permanent masonry sidewalk, patio, driveway or any other horizontal masonry surface, Said second embodiment of this article would allow a novice or skilled mason to easily construct a vertical masonry structure. This second embodiment would provide for a container structure and filler material similar to the above mentioned embodiments. This second embodiment would provide for a container structure to be made of a plurality of vertical and horizontal walls which would form a specific pattern. This container structure would hold the filler bonding material as in the previous mentioned embodiment. This container structure would be suspended vertically to form the length, width and height of the anticipated vertical structure. After the container structure is suspended, the masonry would be inserted into the cavities formed by the vertical and horizontal walls of the container structure. After all of the masonry is inserted into the suspended container structure, the single catalyst according to the first approach or the first of two catalysts according to the second approach is applied to the container structure to saturate and disintegrate the container structure. After the container structure has disintegrated, the single catalyst according to the first approach, or the second catalyst according to the second approach is applied to saturate and cure the filler bonding material. This will result in a permanent vertical structure. After the container structure has disintegrated, the masonry will provide the horizontal and vertical support to the filler bonding material until the filler bonding material can completely cure and harden. After the filler bonding material is hardened, a vertical masonry structure will be formed without the need for mixing and applying mortar and aligning the masonry properly.

The present invention may be embodied as a horizontal structure, (such as a sidewalk, patio, driveway or parking lot), vertical structure (such as a wall), or any other structure that involves the use of masonry or other materials that are bonded together by mortar or a cementious material. However, for the sake of clarity of the disclosure, the illustrative description is consistently phrased for the horizontal and vertical structure embodiment only. The manner in which a building material is bonded together without the need to handle or manipulate the bonding agent, or manually align the building material can be applied to any structure.

As shown in FIG. 1, the container structure 3, serves to contain the filler bonding material 17 and to form a pattern of recesses 4. The container structure 3 is constructed out of a material that is soluble with water (polyvinyl alcohol, gelatin, cellulosics, natural gums, polyethylene oxide etc.) in a preferred embodiment, or soluble with the application of other catalysts according to alternate embodiments. The recesses 4 serve to accept a piece of masonry 5 (or any other building material which requires permanent bonding). The container structure 3 is one continuous structure, in which the top surface of the vertical walls 9, the side surfaces of the vertical walls 7, the upper surface of the lower portion 13, the side surface of the lower portion 11, the bottom surface of the lower portion 15, form a structure 3 that has a hollow volume that contains and encloses filler bonding material 17, and forms recesses 4 to accept masonry or other building material 5. FIG. 1 depicts the container structure before the catalyst is applied.

Figure 2:
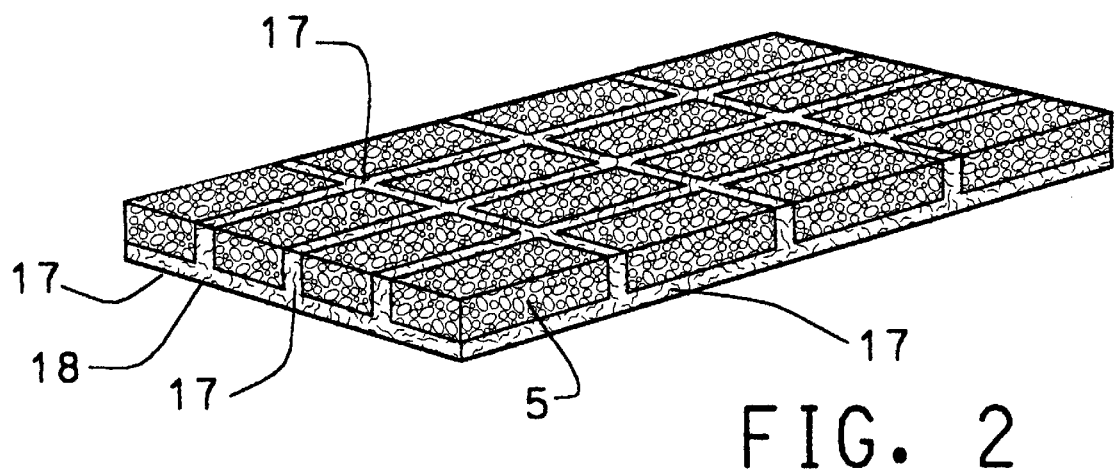
FIG. 2 shows a perspective view of the invention as a completed application according to the first embodiment.

After all of the masonry or other building materials 5 are placed into the recesses 4, the single catalyst according to the first approach or multiple catalysts according to the second approach is applied to the container structure 3, and subsequently to the filler bonding material 17. The finished structure will appear according to FIG. 2. The container structure 3 will no longer exist. The finished structure 18 will consist of the cured and hardened filler bonding material 17, bonding the masonry or other building material 5 to each other and to the surface that the structure 18 is laying on.

Figure 3:
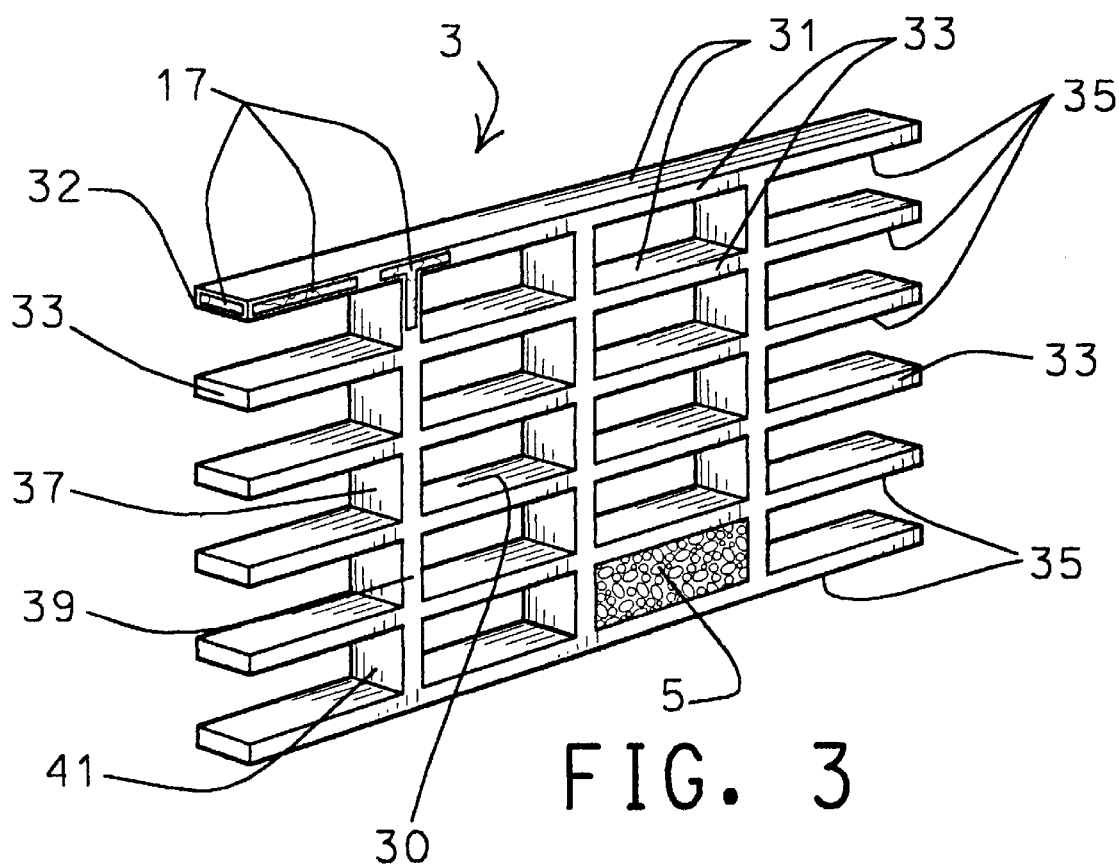
FIG. 3 shows a perspective view and cutaway of the invention according to a second embodiment.

As shown in FIG. 3, the second embodiment, container structure 3 serves to contain the filler bonding material 17 and to form a pattern of cavities 30. The container structure 3 is constructed out of a material that is soluble with water (polyvinyl alcohol, gelatin, cellulosics, natural gums, polyethylene oxide etc.) in the preferred embodiment, or soluble with the application of other catalysts according to alternate embodiments. The cavities 30 serve to accept a piece of masonry 5 (or any other building material which requires permanent bonding). The container structure 3 is one continuous structure, in which the top surface 31 of the horizontal walls 32, the side surfaces 33 of the horizontal walls 32, the top surface 31 of the horizontal walls 32, the bottom surface 35 of the horizontal walls 32, the inside surfaces 37 of the vertical wall 41, and the outside surfaces 39 of the vertical walls 41 and horizontal walls 32 form a structure 3 that has a hollow volume that contains and encloses filler bonding material 17, and forms cavities 30 to accept masonry or other building material 5. FIG. 3 depicts the container structure before the catalyst is applied.

Figure 4:
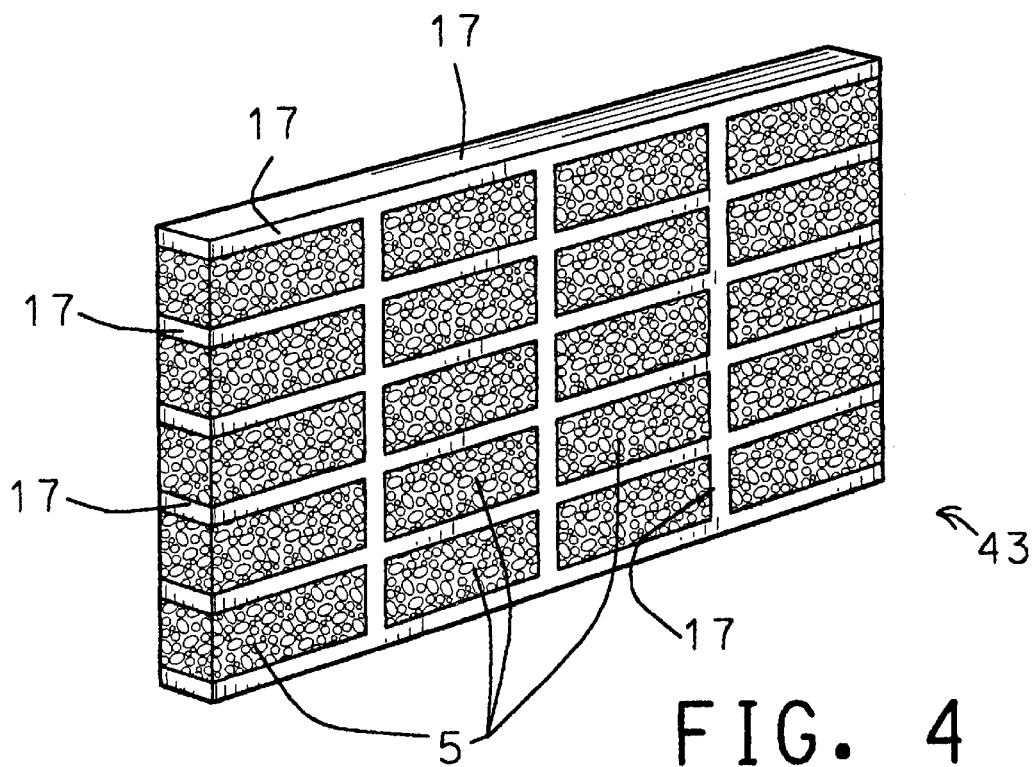
FIG. 4 shows a perspective view of the invention as a completed application according to the second embodiment.

After all of the masonry or other building materials 5 are placed into the cavities 30, the catalyst is applied to the container structure 3, and subsequently the filler bonding material 17. The finished structure will appear according to FIG. 4. The container structure 3 will no longer exist. The finished structure 43 will consist of the cured and hardened filler bonding material 17, bonding the masonry or other building material 5 to each other and to the surface that the structure 43 is laying on and where the cured bonding material 17 is touching other structures.

While a number of exemplary embodiments of the invention have been described using specific terms, such description is for illustrative purposes. It is to be understood that changes and variations may be made without departing from the spirit or scope of the invention. The scope of the invention is limited only so far as the following claims.

What is claimed is:

1. An article of manufacture comprising a container of unitary continuous structure having cavities adapted to accept masonry material, and a bonding agent disposed within said container, said container being dissolvable by contact with an aqueous catalyst, thereby causing said bonding agent to contact said catalyst with consequent curing of said bonding agent to a hardened state.

2. An article of manufacture according to claim 1, wherein said article is utilized to permanently bind masonry units to construct vertical masonry structures.

3. An article of manufacture according to claim 1, wherein said article is utilized to permanently bind masonry units to construct horizontal masonry structures.

4. An article of manufacture according to claim 1 wherein said container is constructed of a material or combination of materials selected from the group consisting of: polyvinyl alcohol, polyethylene oxide, gelatin, cellulosics or natural gums.

5. An article of manufacture according to claim 1, wherein said bonding agent is constructed of a material or combination of materials selected from the group consisting of: cement, mortar or concrete.

6. A method of forming a masonry structure comprising the steps of:

a) placing onto a level surface an article of manufacture of claim 1 comprised of a container which encloses a bonding agent and has cavities adapted to accept masonry material, b) placing units of masonry into said cavities, c) applying an aqueous catalyst to said article of manufacture, which causes said container to dissolve and which further permits contact of said bonding agent by said catalyst, and d) allowing the contacted bonding agent to cure to a hardened state.

* * * * *